(12) United States Patent
Dorsett, Jr. et al.

(10) Patent No.: US 7,818,666 B2
(45) Date of Patent: Oct. 19, 2010

(54) PARSING, EVALUATING LEAF, AND BRANCH NODES, AND NAVIGATING THE NODES BASED ON THE EVALUATION

(75) Inventors: David R. Dorsett, Jr., Slidell, LA (US); Fabrice Ferino, San Francisco, CA (US)

(73) Assignee: Symyx Solutions, Inc., Sunnyvale, CA (US)

( * ) Notice: Subject to any disclaimer, the term of this patent is extended or adjusted under 35 U.S.C. 154(b) by 1242 days.

(21) Appl. No.: 11/342,088

(22) Filed: Jan. 27, 2006

(65) Prior Publication Data
US 2006/0168515 A1   Jul. 27, 2006

Related U.S. Application Data

(60) Provisional application No. 60/647,932, filed on Jan. 27, 2005.

(51) Int. Cl.
G06F 17/28 (2006.01)

(52) U.S. Cl. .................. 715/237; 717/129; 717/143

(58) Field of Classification Search .......... 715/205, 715/234, 237; 717/129, 142–143
See application file for complete search history.

(56) References Cited

U.S. PATENT DOCUMENTS

| | | | | |
|---|---|---|---|---|
| 4,982,338 A | 1/1991 | Fujita | ............... | 703/12 |
| 5,047,929 A | 9/1991 | Fujita | ............... | 703/6 |
| 5,056,035 A | 10/1991 | Fujita | ............... | 703/12 |
| 5,317,507 A * | 5/1994 | Gallant | ............... | 715/260 |
| 5,434,971 A | 7/1995 | Lysakowski | | |
| 5,491,628 A | 2/1996 | Wakayama et al. | | |
| 5,504,891 A | 4/1996 | Motoyama et al. | | |

(Continued)

FOREIGN PATENT DOCUMENTS

EP    1143357 A2    10/2001

(Continued)

OTHER PUBLICATIONS

Symyx Technologies, Inc., International Search Report and the Written Opinion of the International Searching Authority of PCT/US2006/002947 dated Oct. 1, 2007, 14 pages.

(Continued)

*Primary Examiner*—Cesar B Paula
(74) *Attorney, Agent, or Firm*—McDermott Will & Emery LLP

(57) ABSTRACT

Methods, systems, and apparatus, including computer program products, for processing input data and for defining processing operations to be performed on such data. Input data is processed according to a data parser description associated with the input data format, and output data is generated based on the processing. The data parser description includes a plurality of leaf nodes and a plurality of branch nodes arranged in a tree structure. The leaf nodes each have an associated function. Each of the branch nodes has one or more associated child nodes selected from leaf nodes and other branch nodes. The nodes of the data parser description are evaluated in an order defined by the tree structure. For branch nodes, one or more of the associated child nodes are evaluated; for leaf nodes, the associated function is executed based on data in a current location in the input data.

54 Claims, 8 Drawing Sheets

U.S. PATENT DOCUMENTS

| | | | |
|---|---|---|---|
| 5,557,720 A * | 9/1996 | Brown et al. | 715/256 |
| 5,574,656 A | 11/1996 | Agrafiotis et al. | 506/5 |
| 5,623,592 A | 4/1997 | Carlson et al. | |
| 5,708,806 A * | 1/1998 | DeRose et al. | 707/104.1 |
| 5,848,386 A | 12/1998 | Motoyama | |
| 5,848,415 A * | 12/1998 | Guck | 707/10 |
| 5,962,013 A | 10/1999 | Wong et al. | 424/448 |
| 5,980,096 A | 11/1999 | Thalhammer-Reyero | 707/100 |
| 6,009,436 A | 12/1999 | Motoyama et al. | |
| 6,014,680 A | 1/2000 | Sato et al. | |
| 6,030,917 A | 2/2000 | Weinberg et al. | 506/21 |
| 6,085,196 A | 7/2000 | Motoyama et al. | |
| 6,202,201 B1 | 3/2001 | Domi | |
| 6,370,569 B1 | 4/2002 | Austin | |
| 6,410,331 B1 | 6/2002 | Schultz et al. | 506/11 |
| 6,415,276 B1 | 7/2002 | Heger et al. | 706/52 |
| 6,466,240 B1 | 10/2002 | Maslov | |
| 6,526,566 B1 | 2/2003 | Austin | |
| 6,618,852 B1 | 9/2003 | van Eikeren et al. | 717/108 |
| 6,643,691 B2 | 11/2003 | Austin | |
| 6,658,429 B2 * | 12/2003 | Dorsett, Jr. | 707/104.1 |
| 6,678,867 B2 | 1/2004 | Fong et al. | |
| 6,718,336 B1 | 4/2004 | Saffer | |
| 6,738,529 B1 | 5/2004 | Crevier et al. | 382/282 |
| 6,751,653 B2 | 6/2004 | Austin | |
| 6,947,953 B2 | 9/2005 | Herzenberg et al. | 707/104.1 |
| 6,968,536 B2 | 11/2005 | Jazdzewski | 717/106 |
| 6,983,227 B1 | 1/2006 | Thalhammer-Reyero | 703/2 |
| 7,188,055 B2 | 3/2007 | Agrafiotis et al. | 703/2 |
| 7,199,809 B1 | 4/2007 | Lacy et al. | 715/700 |
| 7,308,363 B2 | 12/2007 | Eker et al. | 702/19 |
| 7,478,337 B2 | 1/2009 | Kodosky et al. | 715/771 |
| 7,493,603 B2 * | 2/2009 | Fuh et al. | 717/143 |
| 2001/0047398 A1 | 11/2001 | Rubenstein | 709/218 |
| 2002/0010700 A1 | 1/2002 | Wotring et al. | |
| 2002/0049548 A1 | 4/2002 | Bunin | 702/32 |
| 2003/0130845 A1 | 7/2003 | Poplawski | 704/255 |
| 2003/0221168 A1 * | 11/2003 | Kozlov | 715/513 |
| 2004/0044990 A1 | 3/2004 | Schloegel et al. | 717/113 |
| 2004/0060003 A1 | 3/2004 | Mani et al. | 715/234 |
| 2004/0221260 A1 | 11/2004 | Martin et al. | 717/104 |
| 2005/0130229 A1 | 6/2005 | Dorsett, Jr. | 435/7.1 |
| 2005/0267721 A1 | 12/2005 | Thalhammer-Reyero | 703/11 |
| 2005/0273305 A1 | 12/2005 | Thalhammer-Reyero | 703/11 |
| 2006/0064674 A1 | 3/2006 | Olson, Jr. et al. | 717/113 |
| 2006/0277201 A1 | 12/2006 | Dorsett, Jr. | 1/1 |
| 2007/0050092 A1 | 3/2007 | Kenyon et al. | 700/266 |
| 2007/0143240 A1 | 6/2007 | Goldwasser et al. | 706/47 |
| 2007/0185657 A1 | 8/2007 | Lacy et al. | 702/19 |
| 2007/0203951 A1 | 8/2007 | Dorsett, Jr. | 1/1 |
| 2007/0214101 A1 | 9/2007 | Wang et al. | 706/45 |
| 2008/0015837 A1 | 1/2008 | Smith et al. | 703/12 |

FOREIGN PATENT DOCUMENTS

| | | | |
|---|---|---|---|
| WO | WO 96/17310 | 6/1996 | |
| WO | WO 00/23921 | 4/2000 | |
| WO | WO 00/48088 | 8/2000 | |
| WO | WO 01/55899 | 8/2001 | |
| WO | WO 01/79949 | * 10/2001 | |
| WO | WO 02/054188 | * 11/2002 | |
| WO | WO 02/099677 | 12/2002 | |

OTHER PUBLICATIONS

Zeigermann, Oliver, "XPA: XML Processing for ANTLR", [online], Feb. 2003 [retrieved on Apr. 16, 2008], 4 pages. Retrieved from the Internet:<URL: http://www.zeigermann.de/xpa/concept.html>.

Backofen, R. et al., "Application of constraint programming techniques for structure prediction of lattice proteins with extended alphabets", (Feb. 1999), 17pages.

Raynor, W., The International Dictionary of Artificial Intelligence, (1999), p. 63 and cover only.

Shaheen, M. et al., "Remote Laboratory Experimentation", *Proceedings of the American Control Conference*, Philadelphia, Pennsylvania, (Jun. 1998), pp. 1326-1329.

Thayer, A. "Combinatorial Chemistry Becoming Core Technology at Drug Discovery Companies", *Chem Eng. News*, (Feb. 12, 1996), pp. 57-64.

Umetri AB, MODDE 4-0 Users Guide, Copyright 1992-1997, pp. 1-1 to 14-2 (229 pages), "Graphical Software for Design of Experiments".

Zou, J. et al., "Statistical Theory of Combinatorial Libraries of Folding Proteins: Energetic Discrimination of a Target Structure", *J Mol Biol*, vol. 296 (2000), pp. 281-294.

Abiteboul et al., "The Lorel Query Language for Semistructured Data", Int Journal on Digital Libraries, 1997, vol. 1, pp. 1-40.

Abiteboul, "Querying Semi-Structured Data", 10th International Conference on Adaptive Structures and Technologies, 1997, vol. 1186, 16 pages.

Altova, Inc., "White Paper—Data Integration: Opportunities, Challenges and Altova MapForce 2005", 2004, pp. 1-18.

Altova, Inc, "MapForce 2005 Online Help User Manual", downloaded from www.xmlspy.com, Nov. 10, 2004.

Bea Systems, Inc., "WebLogic Integration 7.0", downloaded from www.e-docs.bea.com, Oct. 8, 2004.

Hammer et al., "Extracting Semistructured Information from the Web", Proceedings of the Workshop on Management of Semistructured Data, 1997, pp. 1-8.

Milo et al., "Schema-Based Data. Translation—Extended Abstract", 1998, pp. 1-9.

Suciu, Dan, "Semistructured Data and XML", Proceedings of the International Conference on Foundations of Data Organization, 1998, 13 pages.

U.S. Appl. No. 09/174,856, filed Oct. 19, 1998, Lacy et al.

U.S. Appl. No. 11/325,267, filed Jan. 3, 2006, Falcioni et al.

U.S. Appl. No. 12/482,353, filed Jun. 10, 2009, Barstow.

Barr, R.S. et al., "Designing and reporting on computational experiments with heuristic methods", Journal of Heuristics Kluwer Academic Publishers Netherlands, vol. 1, No. 1 (Sep. 1995), pp. 9-32.

* cited by examiner

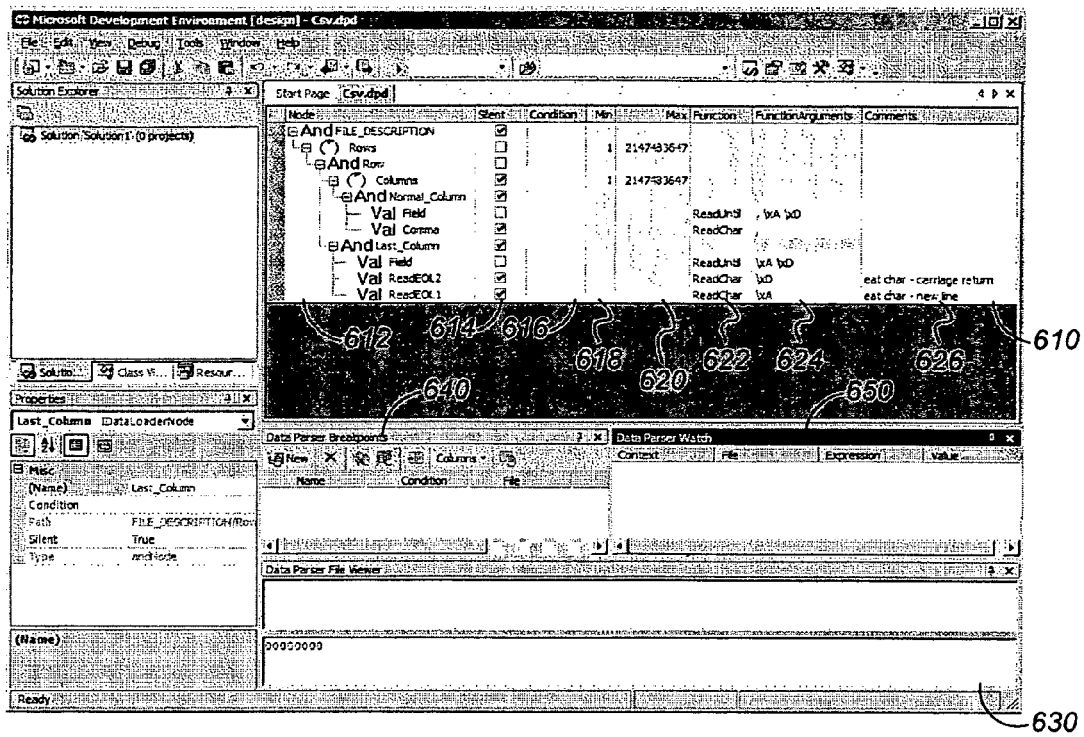
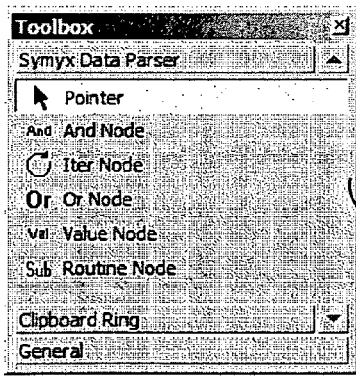
FIG. 6A
FIG. 6B
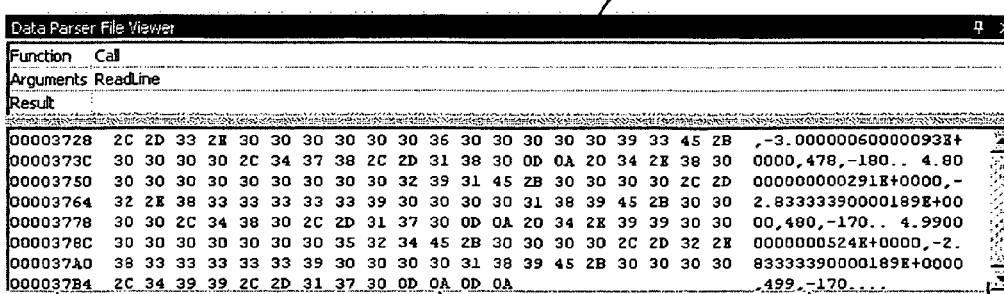
FIG. 6C

FIG. 7

| Node | Silent | Condition | Min | Max | Function | FunctionArguments | Comments |
|---|---|---|---|---|---|---|---|
| And FILE_DESCRIPTION | ☐ | | | | | | |
| Sub ReadLine | ☑ | | | | | | A subroutine to read until t|
| Val ReadUntilEOL | ☑ | | | | ReadUntil | \xA\xD | |
| Val ReadEOL1 | ☑ | | | | ReadChar | \xD | |
| Val ReadEOL2 | ☑ | | | | ReadChar | \xA | |
| (*) Header | ☐ | | 1 | 6 | | | Header: just read 4 lines. |
| Val CallReadLine | ☑ | | | | Call | ReadLine | |
| (*) Graphs | ☐ | | 1 | 2147483647 | | | |
| And Graph | ☐ | | | | | | |
| And Header | ☐ | | | | | | |
| (*) SkipFirst4LinesOfHeader | ☐ | | 1 | 4 | | | |
| Val CallReadLine | ☑ | | | | Call | ReadLine | |
| And XLegend | ☐ | | | | | | |
| Val XTitle | ☐ | | | | ReadUntil | , | |
| Val Comma | ☑ | | | | ReadChar | , | |
| Val XUnit | ☐ | | | | ReadUntil | , | |
| Val CallReadLine | ☑ | | | | Call | ReadLine | |
| And YLegend | ☐ | | | | | | |
| Val YTitle | ☐ | | | | ReadUntil | , | |
| Val Comma | ☑ | | | | ReadChar | , | |
| Val YUnit | ☐ | | | | ReadUntil | , | |
| Val CallReadLine | ☑ | | | | Call | ReadLine | |
| (*) Data | ☐ | | 1 | 2147483647 | | | |
| And DataLine | ☐ | | | | | | |
| Val Field1 | ☐ | | | | ReadUntil | ,\xD | Read until end of line or cor |
| Val Comma1 | ☑ | | | | ReadChar | , | Read comma. If End of line |
| Val Field2 | ☐ | | | | ReadUntil | , | |
| Val Comma2 | ☑ | | | | ReadChar | , | |
| Val Field3 | ☐ | | | | ReadUntil | , | |
| Val Comma3 | ☑ | | | | ReadChar | , | |
| Val Field4 | ☐ | | | | ReadUntil | \xA\xD | |
| Val ReadEOL1 | ☑ | | | | ReadChar | \xD | |
| Val ReadEOL2 | ☑ | | | | ReadChar | \xA | |
| Val CallReadLine | ☑ | | | | Call | ReadLine | Call to read the empty line l |

PARSING, EVALUATING LEAF, AND BRANCH NODES, AND NAVIGATING THE NODES BASED ON THE EVALUATION

CROSS-REFERENCE TO RELATED APPLICATIONS

This application claims the benefit of U.S. Provisional Application No. 60/647,932, filed Jan. 27, 2005.

BACKGROUND

This invention relates to techniques for extracting data from a data source in a first format, and translating the extracted data into a second format.

Laboratory data management systems such as LIMS and ELN systems can significantly increase the efficiency and productivity of experimental research by integrating experimental data across different projects, sites and technologies. Providing an integrated database of an organization's aggregated research information that can be searched and analyzed can improve decision-making and collaboration within and across project teams and departments, and can facilitate regulatory compliance.

A typical research organization may rely on experimental data from a wide variety of sources. Thus, for example, during the development of a typical drug product, researchers may generate characterization and screening data by any number of techniques, including chromatography (e.g., GC, HPLC), spectroscopy (e.g., FTIR, NIR, UV-Vis, NMR), microscopy (e.g., optical, SEM, TEM), particle size measurement, X-ray diffraction, and the like, as well as product data, such as product yields, purity and impurity profiles for starting materials, intermediates, and drug candidates, dissolution studies, and chemical stability measurements for drug candidates and excipients.

In the past, researchers have stored this information in many different locations, including paper laboratory notebooks, reports, network drives (in the case of analytical data, often readable only with the required software), and LIMS. To make all of this disparate data available in a single, integrated data management system, the data must first be translated from its native format into a common format that provides the structure necessary for integrated storage, search and analysis.

SUMMARY

The invention provides methods, systems, and apparatus, including computer program products, for parsing and processing input data and for defining parsing and processing operations to be performed on such data.

In general, in one aspect, the invention provides methods, systems, and apparatus, including computer program products, implementing techniques for processing electronic data having a first format. The techniques include defining a data parser description describing the first format, receiving input data having the first format, processing the input data according to the data parser description, and generating output data based on the processing. The data parser description includes a plurality of leaf nodes and a plurality of branch nodes arranged in a tree structure. The leaf nodes each have an associated function. Each of the branch nodes has one or more associated child nodes selected from leaf nodes and other branch nodes. The processing includes evaluating the nodes of the data parser description in an order defined by the tree structure. The evaluating includes, for branch nodes, evaluating one or more of the associated child nodes, and for leaf nodes, executing the associated function based on data in a current location in the input data.

Particular implementations can include one or more of the following features. Evaluating the nodes can include, for branch nodes, determining whether the node evaluates successfully based on a result of the evaluating one or more of the child nodes, and for leaf nodes, determining whether the node evaluates successfully based on a result of the executing. After evaluating a given node, a next node to evaluate can be determined based on whether the given node has evaluated successfully. Generating output data can include generating structured output data having a structure defined at least in part by nodes of the data parser description. The structured output data can be generated as an extensible markup language document. Generating the structured output data can include, for one or more leaf nodes of the data parser description, reading data from the current location in the input data, and associating the data read from the current location in the input data with an element of the extensible markup language document. Generating the structured output data can include, for one or more leaf nodes of the data parser description, reading data from the current location in the input data, and executing a callback function to send the data read from the current location in the input data to a client, and, in the client, associating the sent data with an element of the extensible markup language document.

The branch nodes can include one or more first nodes (which may be referred to as "AND nodes"), each first node being a branch node that evaluates successfully only if all of its associated child nodes evaluate successfully. The first nodes can include one or more second nodes (which may be referred to as "ROUTINE nodes"), each second node being a first node that is evaluated in response to a call function associated with one or more leaf nodes. The branch nodes can include one or more third nodes, (which may be referred to as "OR nodes"), each third node being a branch node that evaluates successfully if any of its associated child nodes evaluates successfully. The branch nodes can include one or more fourth nodes (which may be referred to as "ITER nodes"), each fourth node being a branch node that defines a number of iterations over one or more child nodes. The fourth node can have a max parameter, a min parameter, and a counter value, and can be evaluated by evaluating each child node associated with the fourth node, if each of the child nodes has evaluated successfully, incrementing the counter value, comparing the counter value with the max parameter, and, if the counter value is less than the max parameter, repeating the evaluating of each child node, and if one or more of the child nodes has riot evaluated successfully, comparing the counter value with the min parameter, such that the fourth node has not evaluated successfully if one or more of the child nodes has not evaluated successfully and the counter value is less than the min parameter, and the fourth node has evaluated successfully if the counter value is equal to the max parameter or if one or more of the child nodes has not evaluated successfully and the counter value is greater than or equal to the min parameter. The data parser description can define a tree containing a plurality of leaf nodes and a plurality of branch nodes selected from the group consisting of fourth nodes, first nodes, and third nodes, each first node being a branch node that evaluates successfully only if all of its associated child nodes evaluate successfully, each third node being a branch node that evaluates successfully if any of its associated child nodes evaluates successfully.

Processing the input data can include, before evaluating a given node in the data parser description, storing a current position in the input data, and if the given node evaluates unsuccessfully, returning to stored position in the input data source before evaluating a subsequent node in the data parser description. One or more of the nodes of the data parser description can be configurable with a condition, the evaluation of a node configured with a condition being dependent on the performance of a test specified by the condition. The input data can be a data file or a data stream. The techniques can include monitoring output from one or more instruments, wherein receiving input data can include detecting a data file or data stream containing experimental data produced by one of the one or more instruments, and using the detected data as the input data. Processing the input data can include using the data parser description to read data from only a portion of the input data. Defining the data parser description can include defining a plurality of data parser descriptions, and processing the input data can include processing the input data according to the plurality of data parser descriptions, where a first portion of the input data is processed according to a first one of the plurality of data parser descriptions and a second portion of the input data is processed according to a second one of the plurality of data parser descriptions. Defining the data parser description can include providing a set of selectable nodes in a graphical user interface, and receiving user input selecting and configuring a plurality of the selectable nodes to define the tree structure of the data parser description.

The invention can be implemented to realize one or more of the following advantages, alone or in the various possible combinations. Data parser programs according to the invention provide a simple, flexible technique for extracting data from diverse data sources and translating the data into a desired format for storage and analysis. As a result, researchers are freed from spending time tracking down data from multiple locations, and are more able to retrieve, analyze, and reuse existing information across project, technological and geographical boundaries. Data parser programs can be defined to perform a wide variety of processing operations.

The inclusion of both structure information and processing instructions in data parser descriptions makes it possible to define multiple different ways to process input data of a given format, without requiring modification of the program code that interprets and implements the processing. The data parser description program can provide for decision-making at runtime based on data processed during earlier execution of the program. The use of a limited programming grammar and visual design techniques makes it possible for users to define data parser programs with little or no familiarity with conventional programming techniques.

Data parser programs can be defined for any number of input and/or output data formats. Data parser descriptions can be defined for all of an input data stream, or for a desired portion or portions of the data stream. Data parser descriptions can be reused to process different input data streams having portions that share a common format. Multiple data parser descriptions can be used together to process complex data streams or perform complex processing operations. Data parser descriptions can be modified at runtime, which makes it possible for users to define or modify data processing operations at runtime.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a block diagram illustrating the structure of a data parser description according to one aspect of the invention.

FIGS. 6A-6F illustrate exemplary user interfaces for generating a data parser description according to one aspect of the invention.

FIG. 7 illustrates an exemplary data parser description generated according to one aspect of the invention.

Like reference symbols in the various drawings indicate like elements.

DETAILED DESCRIPTION

Figure 1:
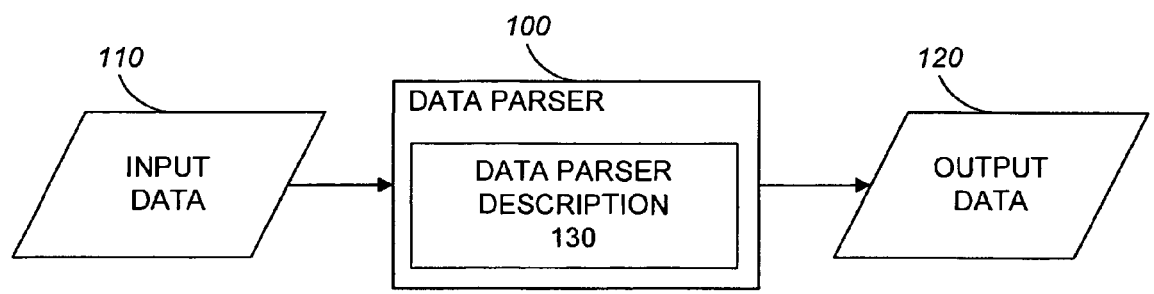
FIG. 1 is a block diagram illustrating a parsing process according to one aspect of the invention.

As shown in FIG. 1, a data parser 100 receives input data 110 in an input format and processes the input data to generate structured output data 120 in an output format. Data parser 100 processes the input data according to structure information and processing instructions that are expressed in a data parser description 130, described in more detail below. In particular implementations, data parser 100 processes the input data by extracting data from the input data and translating the extracted data into the output format as specified in the data parser description instructions.

Figure 2:
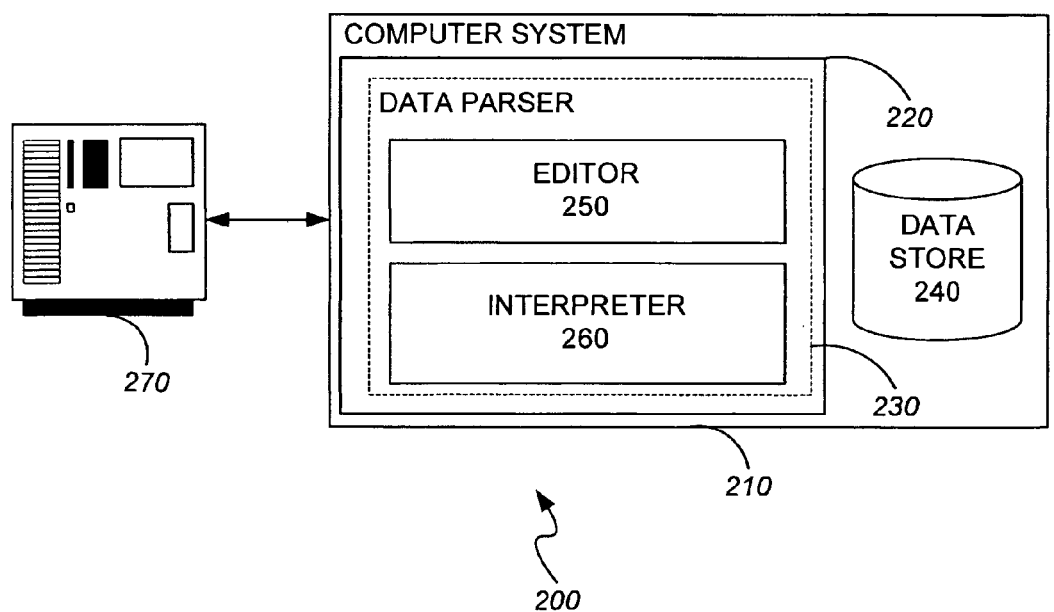
FIG. 2 is a block diagram illustrating a laboratory data management system including a database server process according to one aspect of the invention.

FIG. 2 illustrates a data management system 200 according to one aspect of the invention that includes a general-purpose programmable digital computer system 210 of conventional construction including a memory, a processor 220 for running a data parser engine 230, and a data store 240 for storing information, including experimental data as will be described in more detail below. Data parser engine 230, in turn, includes an editor process 250 and an interpreter process 260, both of which will be described in more detail below. In one implementation, data parser engine 230 is implemented as a module of a laboratory data management system as described in U.S. Pat. No. 6,658,429, WO 02/054188, and WO 01/79949, all of which are incorporated by reference herein. Computer system 210 is operatively coupled to one or more data sources 270. Data sources 270 can represent any source of data for system 200, including local memory, networked computer systems, and external devices, and in particular can include automated or semi-automated laboratory instruments, such as chromatographs, spectrometers, diffractometers and the like, as well as automated and semi-automated materials-handling devices such as liquid- and solid-handling robots. Although FIG. 2 illustrates computer system 210 as a single computer, the functions of the system can be distributed over a network.

Laboratory data management system 200 is configured to manage data generated during the course of experiments. In general, laboratory data management system 200 receives input data from data sources 270, parses the input data in data parser 230 to extract desired information, and stores the extracted data, optionally after performing additional data processing steps, in data store 240. In particular embodiments, the storage and retrieval of extracted experimental data to and from data store 240 can be managed by a database server process running on processor 220 or another computer, as described in U.S. Pat. No. 6,658,429 and WO 02/054188.

Figure 3:
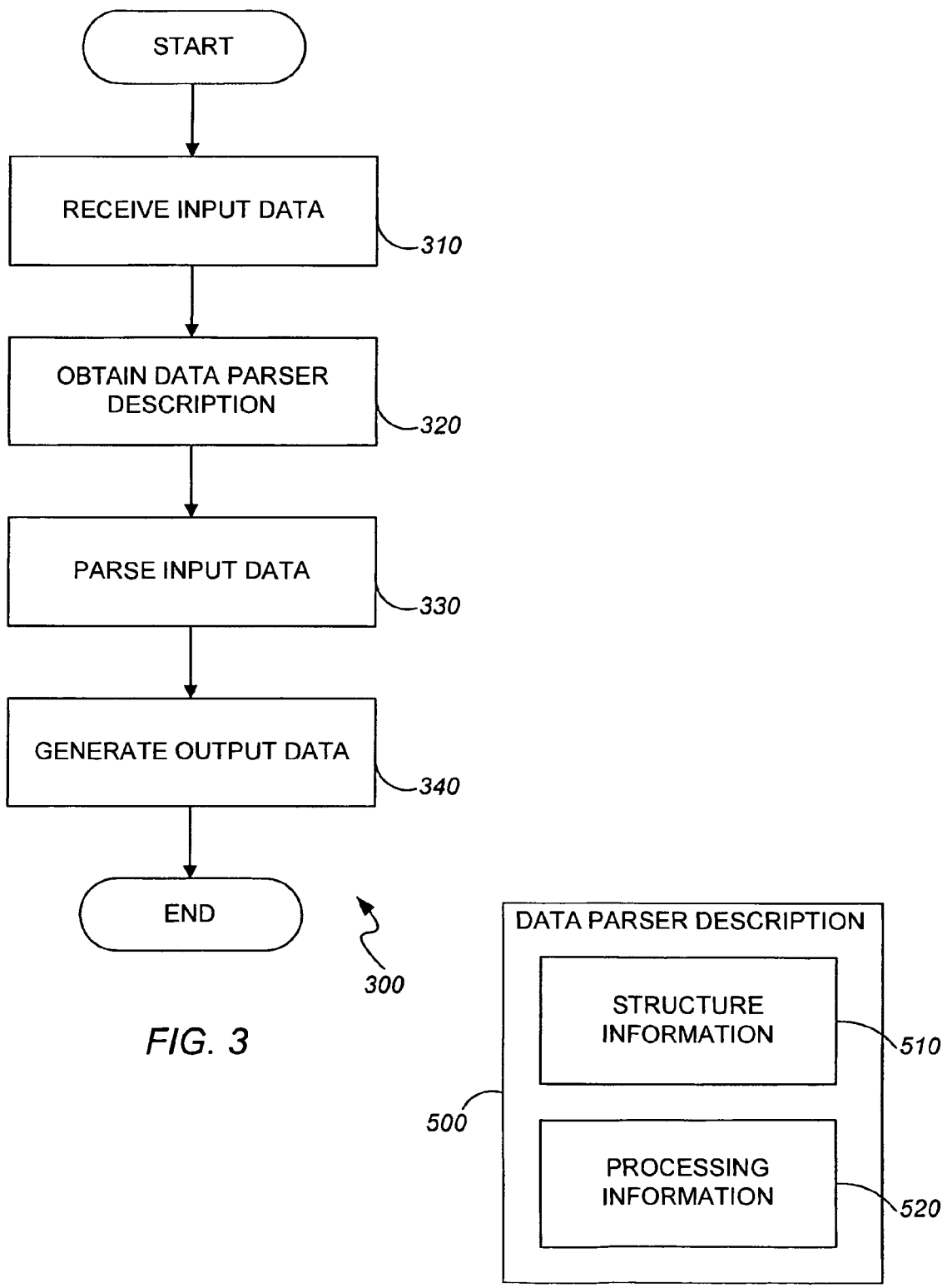
FIG. 3 is a flow diagram illustrating one implementation of a parsing process according to one aspect of the invention.

FIG. 3 illustrates one implementation of the parsing process in more detail. The process 300 begins when parsing engine 230 receives input data in an input format from a data source 270 (step 310). System 200 can be configured to provide a variety of mechanisms for receiving the input data. For example, the parsing engine can receive the input data in response to user instructions to load or open a particular input data file or stream. Alternatively, system 200 can be configured to automatically detect data produced by one or more specified data sources—for example, by monitoring a specified directory or queue. The input data can be received as a data file, stream, or in any other format that can be read and processed using the techniques described herein. System 200 can be configured to recognize and process a variety of different input data types and/or formats—for example, binary data, text data, and the like. In some implementations, the input data can combine data of different types or formats— e.g., a text header followed by an array of binary data. In typical implementations, the structure of the input data is implicit—that is, not described within the input data itself— although structure information can be explicitly included within the input data as well.

The parsing engine obtains a data parser description associated with the input data format (step 320). In some implementations, the parsing engine identifies appropriate data parser descriptions by identifying the input data format—for example, based on a header or other metadata embedded in or associated with the input data—and consulting a mapping table that associates specified data formats with data parser descriptions stored in data store 240. In some implementations, system 200 includes a collection of data parser descriptions associated with a number of different data formats that are recognized by the parsing engine. Each data parser description is associated with a particular input format (which can include some subset of an input format) and/or a particular input data source, so that when the system encounters a data stream from a given data source or of a given type, it recognizes that a particular data parser description should be used to process the data stream. For example, the system can be configured to determine a file location (e.g., directory), file name, or file extension of a specified input data file, and use this information to identify a data parser description associated with the file location, name or extension. Alternatively, the system can be configured to examine the input data file or data stream itself (for example, based on instructions included within a separate data parser description) to identify the data type or format. In still another alternative, system 200 can be configured to prompt the user to identify one or more data parser descriptions to be used with particular input data. Thus, for example, the LDMS can be configured to ask the user to identify a data parser description when it encounters a data stream from a specified data source, or from an unknown or unrecognized data source.

The parsing engine then uses the data parser description to parse the input data (step 330). As described in more detail below, the parsing engine navigates through the input data based on structure information provided in the data parser description, and performs processing operations specified by instructions that the data parser description also provides. In one implementation, the data parser interpreter interprets and/or executes instructions specified in the data parser description, navigating through and processing the input data according to the operations specified in the data parser description. Based on this parsing, the parsing engine generates output data in an output format (step 340), which data is then stored in data store 240. The output data can be in any convenient format, such as a data file, stream and/or collection of objects, and in particular may be structured and/or self-describing format that is useable by a target application, such as a data processing or visualization application, or a database management application. In some implementations, the output data is generated according to an object model implemented by laboratory data management system 200, as will be described in more detail below.

Experiments are performed, for example, using automated devices and/or instruments 270 to perform one or more synthesis and/or screening operations on a single material or on a set of materials such as a library of materials. A library of materials is a collection of members, typically two or more members, generally containing some variance in material composition, amount, reaction conditions, and/or processing conditions. A material can be, for example, an element, chemical composition, biological molecule, or any of a variety of chemical or biological components. Experiments can involve the measurement of numerous variables or properties, as well as processing (or reprocessing) data gathered in previous experiments or otherwise obtained, such as by simulation or modeling. For example, the synthesis, characterization, and screening (i.e., testing) of materials can each constitute a separate experiment. In a synthesis experiment, materials can be created, for example, by combining or manipulating chemical building blocks. In a characterization experiment, materials can be observed or monitored following their creation, or features of the materials can be determined for example by calculation. In a screening experiment, materials can be tested, for example, by exposure to other chemicals or conditions, and observed or monitored thereafter.

An experiment is typically represented by one or more data values for one or more materials of the library. The data values representing an experiment can specify aspects of the experimental design, the methodology of the experiment, or the experimental results. The data values can, for example, identify the chemicals used to create a material, specify the conditions to which the material was exposed, or describe the observable features of a material during or after its creation or manipulation. Data for a synthesis experiment can include information such as the identity, quantity, or characteristics of the chemical building blocks. Data for a characterization experiment can include a description of one of more observed properties or measured values. Data for a screening experiment can include information such as a measured concentration of solid or other constituent.

Each of these different types of experiments can involve one or more different data sources (devices, instruments, etc.), and can generate experimental data in different formats. Thus, data store 240 stores experimental data, including observations, measurements, calculations, and analyses of data from experiments performed by laboratory data management system 200. The data can be of one of many possible data types, such as a number (e.g., integer, float), text (e.g., character data, words, phrases), a data set, or an image. The data can be quantitative, qualitative, or Boolean. The data can be observed, measured, calculated, or otherwise determined for the experiment. The data can be for individual materials, or entire libraries of materials. The data can include multiple measurements for any given material or library member, as when measurements are repeated or when multiple measurements are made, for example, at different set points, different locations within a given element or elements, or at different times during the experiment.

Figure 4:
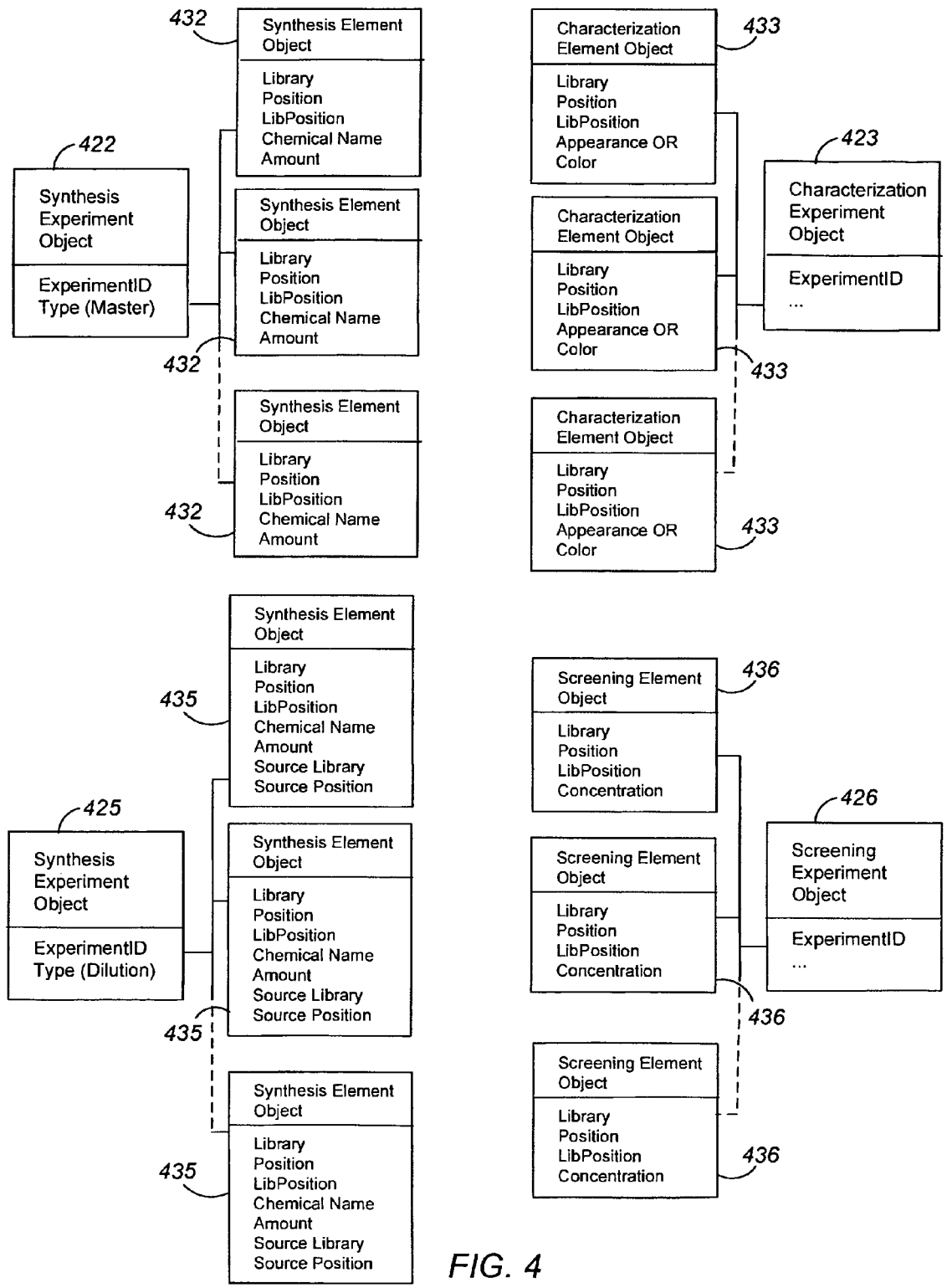
FIG. 4 illustrates one implementation of a data model for storing experimental data.

In one implementation, system 200 integrates this variety of experimental data according to a data model that represents all experiments in a given domain. One example of such a data model is illustrated in FIG. 4. In this object model, an experiment is represented in system 200 by an experiment object 422, 423, 425, 426 having a set of associated properties and methods that represent the experiment. Each experiment object 422, 423, 425, 426 has a unique identifier or experiment ID. There are different classes of experiment object, such as Synthesis 422, 425, Characterization 423, and Screening 426. Each experiment object 422, 423, 425, 426 is associated with one or more experiment element objects 432, 433, 435, 436, which represent individual materials, reactions, transformations, and the like being studied in the experiment. Where the experiment is performed on a library of materials, there may be an element object for each member being studied in the experiment, although in some implementations there can be element objects for only some of the members of a library. The experiment element objects are typically similar across experiment classes. An experiment object can be mapped into a relational database table, for example, for ease of access or for presentation to a user. Exemplary methods for presenting data in a tabular form resembling a relational table are described in U.S. Pat. No. 6,658,429 and WO 02/054188.

To facilitate integration of experimental data in data store 240, parsing engine 230 employs one or more data parser descriptions that are associated with input data formats that can be processed by parsing engine 230. As illustrated in FIG. 5, each data parser description 500 includes structure information 510 that describes the structure of an associated input data format, and also includes processing information 520 that describes instructions that can be implemented to convert data from the associated input format into a format suitable for storage and manipulation according to the data model implemented by system 200. As noted above, in some implementations the data parser description is interpreted by the data parser engine at runtime. In some implementations, the data parser description can be included in a dynamic linked library (DLL) with program code that controls execution of the data parser description. Alternatively, the data parser description can be compiled to generate program code that can be executed by the parsing engine.

In one implementation, the structure information 410 describes a hierarchical structure of nodes that define the branches and leaves of a tree. Branch nodes describe parent elements that contain one or more child elements that can be leaf nodes or other branch nodes. In one implementation, branch nodes can be selected from a predefined set of different branch node types that define different relationships between children of the branch node; for example, branch nodes can be selected from a set of branch node types that define a taxonomy of child node relationships that include at least an "and" relationship" and an "or" relationship of child nodes. Leaf nodes describe elements that contain the actual data (e.g., character data). Each leaf node also includes processing information 420, in the form of information specifying one or more processing operations to be performed during parsing of the input data. Thus, leaf nodes can describe reading operations that are executed to read specified units of the input data and/or to write specified information into the output data. Leaf nodes can also describe other operations, such as operations that generate or track program state to be used later in the execution tree, operations that navigate within the input data (e.g., "find" or "go to" operations), or operations that transform the input data in some specified way.

After loading the data parser description, the data parser engine executes the program defined by the data parser description by visiting data parser description nodes according to the structure of the data parser description tree, starting from the root and going depth-first. At the beginning of each visit, data parser engine 230 saves the current position in the input data, and evaluates the node. Evaluation of the node is a polymorphic operation that depends on the type of node: branch nodes are evaluated by evaluating some or all of the corresponding child nodes; leaf nodes are evaluated by performing the corresponding operations. For any node, if the evaluation succeeds, the parsing engine continues by visiting the next node; if the evaluation fails, the current position in the data reverts to the position before the evaluation of the node, and the failure is propagated back to the parent of the node. This propagation of the failure up the tree will either reach an ancestor node that can deal with the failure or will lead to the failure of the whole parse.

The evaluation of each leaf node yields a return value resulting from the performance of the associated operation, which can be as simple as a character, number or string read from the input data stream, a variable defined according to a conditional test performed on the input data stream, or some other value calculated or determined based on the value or state of the input data stream. Data parser engine 230 can use these return values in subsequent processing. For example, in some implementations, as it parses the input data the parsing engine also constructs an output data stream that incorporates the leaf node return values into a tree that has a structure determined by the branch nodes in the data parser description.

In some embodiments, additional processing flexibility can be provided by incorporating expressions, such as XPath expressions. Such expressions are associated with individual nodes in the data parser description, and can be used to define variables and to provide for conditional evaluation of the corresponding node based on complex conditions. For example, in one implementation as the parsing engine interprets the data parser description, it stores the last value of each node in a separate tree, and uses this tree as a context in which to evaluate the expressions associated with the nodes.

One implementation of a programming language for defining data parser descriptions will now be described in more detail. In this implementation, the data parser description comprises a tree structure formed by combining five different types of nodes: four structure nodes (hereinafter referred to as the AND node, the ITER node, the OR node, the ROUTINE node), which define the branches of the data parser description tree, and a fifth node (hereinafter referred to as the "VALUE node"), which defines the leaves. The four structure nodes define the logical organization of the data parser description tree; each structure node has one or more child nodes, but does not directly access the input data. The VALUE nodes are leaf nodes and cannot have any child nodes. Each VALUE node has an associated function that is executed to perform the data processing functionality of the data parser engine.

Each node has a set of associated properties. In addition to various type-specific properties that will be described below in the context of each node type, each node has a "Silent" property that dictates whether the node will be represented in the output data. If the Silent property is True, then the node will not appear in the output data structure, although its children still may. Each node may also have a "Condition" property that specifies a test to be performed before the node is executed. In one implementation, the condition is specified in the form of an XPath expression.

Unlike the structure nodes discussed below, the VALUE node has no children. Each VALUE node has a "Function" property that identifies a data processing function that will be executed when the node is evaluated, and zero or more "Argument" properties that specify arguments to the function. A VALUE node is evaluated by executing the associated function. These functions are limited in number and perform simple operations on the data. Besides the fact that they return a success or failure result, they can also take arguments and they return the data they read in the form of a string. This string gets incorporated to the produced XML file or is passed as argument to the callback function.

The AND node can have zero to many child nodes, and describes a structural unit that contains zero to many subunits (corresponding to the child nodes). The AND node evaluates successfully only if all of its child nodes evaluate successfully. In one implementation, AND nodes are evaluated by evaluating each of their child nodes in turn until either the evaluation of one of the children fails or there are no more child nodes to evaluate. Alternatively, all child nodes can be evaluated, regardless of success or failure. The AND node can be used for constructions in which each child sees successive and different parts of the data stream. As a result, the AND node can be used to construct complex reading operations that must succeed or fail in block. The AND node has no properties other than the common properties identified above.

The OR node can also have zero to many children, and describes a structural unit that can contain one or more alternative subunits (corresponding to some subset of child nodes). Unlike the AND node, the OR node evaluates successfully if any one or more of its child nodes evaluates successfully. In one implementation, OR nodes are evaluated by evaluating each of their child nodes in turn until either the evaluation of one of the children succeeds or there are no more child nodes to evaluate. The OR node can be used in constructions in which each child node may see the same part of the data. As a result, the OR node can be used to create branching in the execution tree. The OR node has no other property than the common properties identified above.

The ITER node can have zero to many children, and describes a structural unit that can contain repeating subunits. The ITER node has three properties in addition to the common properties identified above: a "Minimum" property that specifies a minimum number of iterations, a "Maximum" property that specifies a maximum number of iterations, and a "Counter" that records the number of iterations performed. Like the AND and OR nodes, the ITER node is evaluated by evaluating its child nodes in turn. If all of the child nodes evaluate successfully, the ITER node increments its Counter and compares it with the value of the Maximum property. If the values are equal, then the ITER node evaluates successfully. If the Counter value is less than the value of the Maximum property, then the child nodes are evaluated again.

On the other hand, if the evaluation of one or more of the child nodes fails, the ITER node compares the Counter value to the value of the Minimum property. If the Counter value is less than the Minimum value, the evaluation of the ITER node has failed. Otherwise, the ITER node evaluates successfully. In one implementation, ITER nodes are evaluated by evaluating each child node in turn until either the evaluation of one of the children fails or they all succeed. Alternatively, all child nodes can be evaluated, regardless of success or failure. The ITER node can be used to construct complex reading operations, like the AND node, but also offers the ability to repeat the operation, while providing a form of branching similar to the OR node.

The ROUTINE node is a special type of AND node that is only executed when it is called by a Call function associated with a VALUE node as described below. ROUTINE nodes can be used to construct sub-trees that can be called multiple times and from different parts of the data parser description tree. The Routine node has no other property than the common properties identified above.

As noted above, the data parser description can define processing operations in the form of functions associated with VALUE nodes in the data parser description tree. Each function can take zero or more arguments, which are specified as space delimited strings (as properties of the corresponding VALUE node as noted above). The meaning of arguments depends on the function to which they are applied, as illustrated in the examples discussed below. VALUE node functions succeed or fail when executed. The parsing engine can use this success or failure to determine which node in the tree to execute next. Execution of a function can also generate a return value—for example, a text string—which the parsing engine can incorporate into the output data generated by the parse. Thus, for example, in implementations in which system 200 is configured to translate an input data stream into an XML document, these return values can be incorporated into the output document as content of a hierarchy of XML elements arranged according to the structure of the data parser description tree. An exemplary set of functions suitable for use in a system configured to provide for the translation of binary input streams into XML output will now be described. Particular implementations of a system 200 may incorporate any combination of one or more such functions, and may include other functions as well.

A Call function takes an argument in the form of a string that identifies a ROUTINE node, and triggers the execution of the ROUTINE node identified by the string argument. The Routine node is located by testing all children of the parent of the VALUE node to determine whether one of them is a ROUTINE node with a name that matches the specified string. If this is the case, this ROUTINE node is executed. If there is no match, then all the children of the grand-parent are tested, and so forth until a ROUTINE node having a name that matches the specified string is found, or the search reaches the root, in which case an exception is raised. The Call function fails if and only if the execution of the Routine node fails. The return value is empty.

A Find function can be used to locate one or more strings in the input data stream. The function takes one or more arguments, each of which is a string to be located in the data stream. The function searches for the first occurrence of any argument string, starting from the current position in the input data stream. When an argument string is found, the function stops, leaving the stream pointer at the first byte after the found string. The function fails when none of the argument strings is found in the data stream. The return value is the string that was located by the function.

A JumpTo function changes the position in the data stream to the specified part of the stream relative to the beginning of the stream, the current position in the stream, or the end of the stream. The function takes two arguments—a number (e.g., negative or positive in decimal format) that represents the difference between a reference point and the target position, and a reference indicator that identifies the reference point to be used. The reference indicator can be implemented, for example, as a single letter "B", corresponding to the beginning of the input data stream, "E", corresponding to the end of the data stream, or "C", corresponding to the current position in the stream. The function fails when the specified position falls outside the range of valid positions in the data stream (e.g., 0 through the size of the input stream). The return value is a string that contains the new file position (e.g., relative to the beginning of the input stream) in decimal format.

A ReadChar function reads a single character or byte at the current position in the data stream. The function takes zero or more arguments, which specify which characters are allowed. The function fails if there are no characters to be read at the current file position, or if the character read does not match any of the supplied arguments. The return value is a string that contains the character read.

A group of functions ReadShort, ReadLong, ReadFloat, and ReadDouble can be used to read a numeric value—a short (16 bit integer value), a long (32 bit integer value), a float (32 bit floating point value) or a double (64 bit floating point value), respectively. These functions take no arguments (i.e., any argument specified for these functions is ignored). The function fails if not enough bytes can be read at the current position in the data stream. The return value is a string that contains the value of the number that was read in decimal format.

A ReadUntil function reads the input data stream from the current position until it either reaches the end of the data stream, or reads a character that matches one of the arguments. The function takes zero or more arguments, which specify which characters will stop the reading when encountered. The function does not fail. The return value is a string that includes all characters that were read up to, but not including, the character that caused the read operation to stop.

A ReadWS function reads the input data stream from the current position until it reaches the end of the data stream, reads a character that is not "white space" (i.e., the character 0x20 and those between the ASCII codes 0x09 and 0x0D inclusive), or reads a character that matches one of the arguments. The function takes zero or more arguments, which specify white space characters that will stop the reading when encountered. The function does not fail. The return value is a string that includes all (white space) characters that were read up to, but not including, the character that caused the read operation to stop.

A ReadTextWord function reads the input data stream from the current position until it reaches the end of the data stream, reads a "white space" character (i.e., the character 0x20 or and those between the ASCII codes 0x09 and 0x0D inclusive), or reads a character that matches one of the arguments. The function takes zero or more arguments, which specify characters that will stop the reading when encountered. The function fails if no character was read before the function stopped. The return value is a string containing all characters that were read up to, but not including, the character that caused the read operation to stop.

A Set function sets the value of its node independent of the data stream being read. VALUE nodes associated with this function operate as Variable nodes. The function takes one or more arguments in the form of XPath expressions that are evaluated in the execution tree. All the results of the arguments are then concatenated as strings to form the result of the function. The function does not fail. The return value is the value of the node.

In some implementations, it may be advantageous to accept Xpath expressions more generally as arguments instead of strings (e.g., using the syntax "\(XPath Expression)"), although performance may suffer. When the node is evaluated, the Xpath expression will be evaluated in the context of a separate tree that is maintained by the parsing engine and that stores the last value of each node, as discussed above. Thus, for example, an argument in the form "-(number (../JUMP))" will return a string that corresponds to the negative numeric value of the sibling node with the name JUMP.

In many implementations, the limited set of functions just described may be adequate to handle most parsing required for routine translation of input data streams. However, in some cases it may be desirable to provide for custom functions—for example, where none of the pre-defined functions can return the correct result or where the use of the built-in functions would lead to unacceptable performance, developing a custom function can be the solution. Thus, for example, custom functions can be provided to read strange data encoding (endianness), or to perform some computational task to improve performance in handling large amounts of binary data.

As noted above, system 200 can include an editor 250, which can be invoked by a user to generate data parser descriptions. To generate a data parser description, the user typically obtains a sample data stream in the desired format, and opens the data stream in the data parser editor. The data parser editor provides a graphical user interface that includes a data viewer pane that displays a representation of the sample data stream, and a data parser pane that displays a representation of the developing data parser program for the data stream. The user inspects the data stream in the data viewer, and enters data parser code in the parser pane (for example, by selecting from a taxonomy of predefined data parser nodes and specifying properties and function arguments, as discussed above) to define the nodes required to traverse and process the data stream to produce the desired result.

In one implementation, the system also provides a debugging and/or testing module, which may be provided as a component of the editor 250, and which can be used during the programming process to test the data parser program being developed before the corresponding data parser description is published for use by the data parser engine. When the user indicates that programming is complete (or optionally at any time during the programming process), the editor publishes the data parser program to the laboratory data management system as a data parser description.

One particular implementation of the data parser engine 230 will now be described. In this implementation, the data parser engine is implemented as a COM in-process automation server that implements and/or defines a set of COM interfaces and objects. The data parser engine defines two object classes: a FileDescription class of objects and a DescriptionNode class of objects. The FileDescription object is the main object. This is the only object that can be created and it corresponds to the contents of a data parser description file. A File Description is a tree and each node of the tree is represented by a DescriptionNode object.

The FileDescription object exposes methods and properties that can be used to load and save data parser description files, to parse data files and streams, and to access the nodes of the tree. The FileDescription object provides two methods that can be used to load or save the contents of the FileDescription object to a data parser description file:

HRESULT ReadDescription(BSTR DescriptionFileName);

HRESULT SaveDescription(BSTR DescriptionFileName);

where DescriptionFileName is the name of the file used for the operation, and the functions return S_OK if the operation is successful, and an error code if not. A third method can be invoked to load the content of a FileDescription file as represented by an XML string (described in more detail below):

HRESULT ReadXMLDescription([in] BSTR XMLDescription);

Where the string XMLDescription contains the content of a data parser description file in XML format. Again, the function return S_OK if the operation is successful, and an error code if not.

The FileDescription object provides a number of methods that can be used to parse an input data stream once a data parser description file has been loaded, according to two techniques that differ in the way the parsed data is communicated back to the client. In a first technique, the parsed data is placed directly into a new XML document according to the instructions described in the data parser description file. In a second technique, the parsed data is sent to the client in increments, by calling back well-defined functions implemented by a callback object, also following the rules of the data parser description file. The FileDescription object provides multiple methods for each technique, depending on the source of the data, which can be a file or any object that implements the standard IStream COM interface.

The FileDescription object has two functions that can be invoked to read the input data and generate an output XML document:

```
HRESULT ReadDataFile(
[in] BSTR DataFileName,
[in] VARIANT Options,
[out,retval] IDispatch** DOMDocument);
HRESULT ReadDataStream(
[in] IUnknown* Stream,
[in] VARIANT Options,
[out,retval] IDispatch** DOMDocument);
``` where DataFileName is name of an input data file, Options is a parameter that can be used to control aspects of execution of the data parser description, such as whether the execution is under control of a debugger, as will be described in more detail below, DOMDocument identifies the XML document that is produced, and Stream identifies the input stream, which can be any object that implements the IStream interface. The functions return S_OK if the operation is successful, S_FALSE if the parse failed or was canceled and an error code if there was an exception. The DOMDocument object returned by either of these functions can be implemented using any conventional XML parser, such as the Microsoft XML Parser, and can be manipulated as any conventional XML document. The hierarchical structure of this document is directly related to the hierarchical structure of the data parser description file loaded by the FileDescription. In general, a node in the XML document corresponds directly to a node in the data parser description tree—for example, each node in the data parser description can have a name property, and the returned DOMDocument may contain an element with the same name as a corresponding node in the data parser description. However, nodes identified as "Silent" will not appear in the XML document, and children of ITER nodes may have more than one corresponding node in the XML document.

For example, the following fragment of a data parser description:

```
<BIN type="AND">
    <NUM_SIGS silent= "1" type="VALUE" func="ReadChar" />
    <POSITION type="VALUE" func="JumpTo" args="0 C" />
    <BINARY_DATA type="ITER" min="1">
        <F type="VALUE" func="ReadFloat" />
    </BINARY_DATA>
</BIN>
``` will generate a DOMDocument containing the following XML:

```
<BIN>
    <POSITION>1172</POSITION>
    <BINARY_DATA>
        <F>-3</F>
        <F>1</F>
        <F>8.67792</F>
        <F>39.9782</F>
        <F>100.006</F>
        <F>0.00226667</F>
    </BINARY_DATA>
</BIN>
```

Note that in this example, the <NUM_SIGS> node is not present in the output because it is marked as "Silent", and note the multiple <F> nodes generated by the <BINARY_DATA> ITER node.

The FileDescription object also has a number of methods that can be invoked to perform a callback function in which data is read from the input data file or stream and returned to a client, where it can be subjected to additional processing as desired. The callback technique gives the programmer more control over how the data is parsed than the previous technique, and is also more efficient in terms of memory and CPU usage, as the data does not have to be stored in a single large XML document, which is likely to be bigger than the raw data because of the overhead of the XML tags and will often be in a format that is not precisely what is desired and will need to be transformed or parsed again.

These include:

```
HRESULT ReadDataFileCB(
[in] BSTR DataFileName,
[in] VARIANT Options,
[in] DDataParserCB* CallBack);
``` and

```
HRESULT ReadDataStreamCB(
[in] IUnknown* Stream,
[in] VARIANT Options,
[in] DDataParserCB* CallBack);
``` where DataFileName is the name of an input data file, Options is a parameter that can be used to control aspects of execution of the data parser description, CallBack is an object that implements the DDataParserCB dispinterface, and Stream is any object that implements the IStream interface. The functions return S_OK if the operation is successful, S_FALSE if the parse failed or was canceled and an error code if there was an exception.

The DDataParserCB dispinterface is defined in the type library of the data parser engine has five methods:

VARIANT_BOOL Start( );

which can be used to perform pre-parse initialization, and which is called before the parse reaches the first node, and returns "True" to continue and "False" to cancel the rest of the parse;

```
VARIANT_BOOL EnterNode(
BSTR NodePath,
long FilePosition,
long PrevFilePosition);
``` which is called when the interpreter enters a data parser description node, where NodePath identifies the full path to the node, FilePosition is the current file or stream position (in bytes), PrevFilePosition is the previous file or stream position (for the previous node, also in bytes), and returns "True" to continue and "False" to cancel the rest of the parse;

```
VARIANT_BOOL FunctionResult(
BSTR NodeName,
enum DPFunction FuncId,
BSTR Args,
BSTR Value,
VARIANT_BOOL Success);
``` which is called to communicate the result of a data parser function, where NodeName is the name of the node (not the full path), FuncId is an identifier of the function being called, Args are argument to the function, Value is the value returned by the function, and Success specifies whether the function succeeded or not, and the function returns "True" to continue and "False" to cancel the rest of the parse;

```
VARIANT_BOOL LeaveNode(
BSTR NodePath,
VARIANT_BOOL Success);
``` which is called when the interpreter leaves a node, where NodePath is the full path to the node, and Success specifies whether the execution of the node succeeded or not, and again the function returns "True" to continue and "False" to cancel the rest of the parse; and void End(VARIANT_BOOL Success);

which is called when the parse terminates normally—that is, when none of the callback functions returned False to cancel the parse and when there was no catastrophic failure of the parse—where Success specifies whether the parse succeeded or not—that is execution of the root node of the File Description object succeeded.

While the DDataParserDB interface described above can be used with any COM-aware language, including weakly typed scripting languages, because it is a dispinterface, calling the functions can lead to a decrease in performance. In implementations using a language capable of strong typing, such as Visual Basic, or Visual C++, an alternative set of callback functions can be used to improve the performance. These functions are implemented by another interface of the FileDescription object: the IFileDescriptionEx.

The IFileDescriptionEx interface provides two functions that can be used to parse data with callbacks:

```
HRESULT ReadDataFile(
[in] BSTR DataFileName,
[in] VARIANT Options,
[in] IDataParserCB* CallBack);
HRESULT ReadDataStream(
[in] IUnknown* Stream,
[in] VARIANT Options,
[in] IDataParserCB* CallBack);
``` where DataFileName is the name of an input data file, Options is a parameter that can be used to control aspects of execution of the data parser description, CallBack is an object that implements the IDataParserCB dispinterface, and Stream is any object that implements the IStream interface. The functions return S_OK if the operation is successful, S_FALSE if the parse failed or was canceled and an error code if there was an exception.

The IDataParserCB is very similar to the DDataParserCB dispinterface. It is also defined in the type library of the data parser engine and has five methods analogous to the DDataParserCB methods discussed above:

```
HRESULT Start([out, retval] VARIANT_BOOL* Continue);
HRESULT EnterNode(
[in] BSTR NodePath,
[in] long FilePosition,
[in] long PrevFilePosition,
[out,retval] VARIANT_BOOL* Continue);
HRESULT FunctionResult(
[in]BSTR NodeName,
[in] enum DPFunction FuncId,
[in] BSTR Args,
[in] BSTR Value,
[in] VARIANT_BOOL Success,
[out,retval] VARIANT_BOOL* Continue);
HRESULT LeaveNode(
[in] BSTR NodePath,
[in] VARIANT_BOOL Success,
[out,retval] VARIANT_BOOL* Continue);
HRESULT End([in] VARIANT_BOOL Success);
```

The RootNode property of the FileDescription object provides access to the nodes of the data parser description tree:

HRESULT RootNode([out, retval] IDescriptionNode* *pVal);

This property returns a DescriptionNode object that corresponds to the root node of the tree. The DescriptionNode object offers a number of methods and properties that can be used to manipulate the tree.

The DescriptionNode object provides access to a node of a FileDescription (data parser description) tree. This object is just an access point to the real node: that is, two DescriptionNode objects can be different but actually refer to the same node. If the node to which a DescriptionNode object refers no longer exists, calling a property or method of the DescriptionNode object results in an error message. The methods and properties of the DescriptionNode object can be used to modify the properties of a node, and to navigate through the tree and modify the tree structure itself.

The DescriptionNode object's Type property returns the type of the node:

HRESULT Type([out, retval] E_NodeType *pVal);

The Type property is read-only; once a node is created, its type cannot be changed.

The Name property can be used to set or to get the name of the node:

HRESULT Name([out, retval] BSTR *pVal);
  HRESULT Name([in] BSTR newVal);

Each node must have a unique name—i.e., nodes that have the same parent must have a different name. Trying to rename a node with a name that is already used by one of its sibling generates an error.

The Path property (read-only) returns the full path to the node:

HRESULT Path([out, retval] BSTR *pVal);

The path is built by concatenating the node names separated by the character '/' starting from the root node until the current node is reached. Because of the rules for the Name property, a Path uniquely identifies a given node.

The Silent property specifies whether the node will appear in an output XML document, as discussed above:

HRESULT Silent([out, retval] VARIANT_BOOL *pVal);
  HRESULT Silent([in] VARIANT_BOOL newVal);

The Condition property identifies a condition that will be tested during evaluation of the node, as discussed above:

HRESULT Condition([out, retval] BSTR *pVal);
  HRESULT Condition([in] BSTR newVal);

The Minimum (Min) and Maximum (Max) properties define minimum and maximum parameters for ITER nodes, as discussed above:

```
HRESULT Min([out, retval] long *pVal);
HRESULT Min([in] long newVal);
HRESULT Max([out, retval] long *pVal);
HRESULT Max([in] long newVal);
```

Using these properties for a Node that is not of the type "ITER" generates an error.

The Function and Function arguments properties are read-only, and are set using a SetFunction method described below:

HRESULT Function([out, retval] E_DPFunction *pVal);
  HRESULT FunctionArguments([out, retval] BSTR *pVal);

Using these properties for a node that is not of the type "VALUE" generates an error.

The SetFunction method is used to set the Function and the Arguments for the function for a node of type "VALUE":

```
HRESULT SetFunction(
[in] E_DPFunction Fun,
[in, defaultvalue("")] BSTR Args);
```

The Arguments parameter is optional and defaults to the empty string. Using this function for a Node that is not of the type "Value" generates an error.

The XML property (read-only) can be used to get the XML representation of a node (including its children):

HRESULT XML([out, retval] BSTR *pVal);

The XML string obtained by using this property on the Root Node can be used with the FileDescription object method "ReadXMLDescription". For other nodes, the XML can be used to transfer whole sub-trees by using the DescriptionNode method "CreateChildTree" described below.

The FileDescription property (read-only) returns the FileDescription object to which a node belongs:

HRESULT FileDescription([out, retval] IFileDescription* *pVal);

The Parent property (read-only) returns the parent of a node:

HRESULT Parent([out, retval] IDescriptionNode* *pVal);

The NextSibling property returns or sets the next sibling of the DescriptionNode:

HRESULT NextSibling([out, retval] IDescriptionNode* *pVal);
  HRESULT NextSibling([in] IDescriptionNode* pVal);

When used to set the next sibling, the node passed as argument is removed from the current tree to which it belongs and becomes the next sibling of the node. Errors are generated if the node passed as argument has a name identical to one of the current siblings or if the operation would create a circular path in the tree because the node passed as argument is currently an ancestor of the node.

The FirstChild property returns or sets the first child of the DescriptionNode:

HRESULT FirstChild([out, retval] IDescriptionNode* *pVal);
  HRESULT FirstChild([in] IDescriptionNode* pVal);

When used to set the first child, the node passed as argument is removed from the current tree to which it belongs and becomes the first child of the node. Errors are generated if the node passed as argument has a name identical to one of the current children or if the operation would create a circular path in the tree because the node passed as argument is currently an ancestor of the node.

The LastChild property returns or sets the last child of the DescriptionNode:

HRESULT LastChild([out, retval] IDescriptionNode **pVal);
  HRESULT LastChild([in] IDescriptionNode* newVal);

When used to set the last child, the node passed as argument is removed from the current tree to which it belongs and becomes the last child of the node. Errors are generated if the node passed as argument has a name identical to one of the current children or if the operation would create a circular path in the tree because the node passed as argument is currently an ancestor of the node.

The SelectSingleNode method returns the child node that corresponds to the path:

```
HRESULT SelectSingleNode(
BSTR path,
[out, retval] IDescriptionNode* *pVal);
```

The path can start with or without the name of the current node. If there is no node that corresponds to the path (found among the descendants of the node), no DescriptionNode object is returned. If the path is empty or only consists of the name of the current node, a new DescriptionNode that refers to the same node is returned.

The CreateChild method is used to create a new child node with the type and name specified by the first two parameters:

```
HRESULT CreateChild(
    [in] E_NodeType pVal,
    [in] BSTR Name,
        [in, defaultvalue(0)] IDescriptionNode* pPrevSibling,
        [out, retval] IDescriptionNode** pNewVal);
```

An optional third parameter can be used to specify the position among the current children of the new node. An error is generated if the name does not follow the rules described for the Name property. If the PrevSibling parameter is NULL or does not correspond to a child of the current node, the new node is created as the first child of the node.

The Delete method deletes the node:

HRESULT Delete( );

Any subsequent calls to any method or property of the DescriptionNode object will generate an error. If another DescriptionNode object refers to this same node, any calls to any method or property of these objects will also generate an error.

The CreateChildTree creates a sub-hierarchy under the current node:

```
HRESULT CreateChildTree(
    [in] BSTR xmlVal,
        [in, defaultvalue(0)] IDescriptionNode* pPrevSibling,
        [out, retval] IDescriptionNode** pNewVal);
```

The first parameter xmlVal can be obtained by getting the XML property of another DescriptionNode object. The method will insert a copy of this object (and of all its children) as a new child of the node. The second optional parameter can be used to specify the previous sibling of the new node (see the description of the CreateChild method). The new child cannot have the same name as an existing child.

The ID property (read-only) can be used to get a unique ID that unambiguously identifies the node referred to by a DescriptionNode object:

HRESULT ID([out, retval] long *uniqueId);

The IsChildOf property checks whether the current node is a descendant of the DescriptionNode object passed as parameter:

```
HRESULT IsChildOf(
    [in] IDescriptionNode* pParent,
        [out, retval] VARIANT_BOOL *pVal);
```

One implementation of a data parser editor that can be used with this data parser engine will now be described. The editor includes a Graphical Editor, which simplifies the process of authoring and modifying data parser programs. These programs can then be tested quickly by running them under the control of a debugger that provides code and data breakpoints, a step mode, and also provides visual feedback of where in the data file the data parser execution is taking place. The editor can also be used to debug data parser executions that are occurring in a separate executable.

The Graphical Editor provides an editor window 600, in which the data parser program is represented as a hierarchy or tree, as illustrated in FIG. 6A. Editor window 600 includes a number of panes, including, inter alia, some or all of the following: a data parser description pane 610, which displays a hierarchical view of the current data parser description, an input file view pane 630, which displays portion of the input data file that is being processed, a breakpoints view pane 640, which identifies any breakpoints set in the open data parser descriptions, and a watch view pane 650, which can be used to display the values of specified expressions during debugging operations, all of which will be described in more detail below.

The data parser description pane 610 displays the hierarchy of the current data parser description. This pane includes a Node column 612 that displays the nodes included in the data parser description and the hierarchy in which they are arranged. A Silent column 614 can be used to set the Silent property, which determines whether the node will be included in the output XML, as discussed above. The Condition column 616 can be used to specify a condition on evaluation of the node (e.g., a condition that must be met before the node is executed). Min and Max columns 618, 620 can be used to set those respective properties of ITER nodes, as discussed above. The Function column 622 can be used to specify functions for VALUE nodes, as discussed above. Arguments to these functions are specified in the FunctionArguments column 624. The Comments column 626 can be used to enter comments about the node.

The user creates a data parser description hierarchy shown in pane 610 by selecting and arranging desired nodes from a toolbox 660, which can be implemented as a drop-down or pop-up menu as illustrated in FIG. 6B. To add a node, the user drags and drops the desired node to the parent node. Frequently-used constructs can be added to the toolbox by selecting and dragging them into the toolbox; these constructs can then be added to other data parser description hierarchies as a pre-defined unit.

The input file view pane 630 is used while debugging, and, as shown in FIG. 6C, includes a top frame 632 that displays the properties of the last function call that was executed—name of the function, its arguments and the result of the call. The bottom frame 634 displays the part of the data file being processed, which includes a left column 635 showing the position in the file in hexadecimal, a middle column 637 displaying a binary view of the file with the bytes encoded in hexadecimal, and a right column 639 showing a text representation of the bytes that are displayed in the middle part.

Figure 6D:
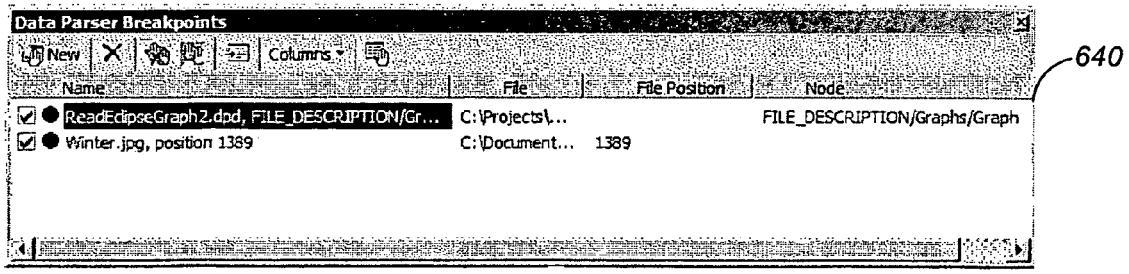
Figure 6E:
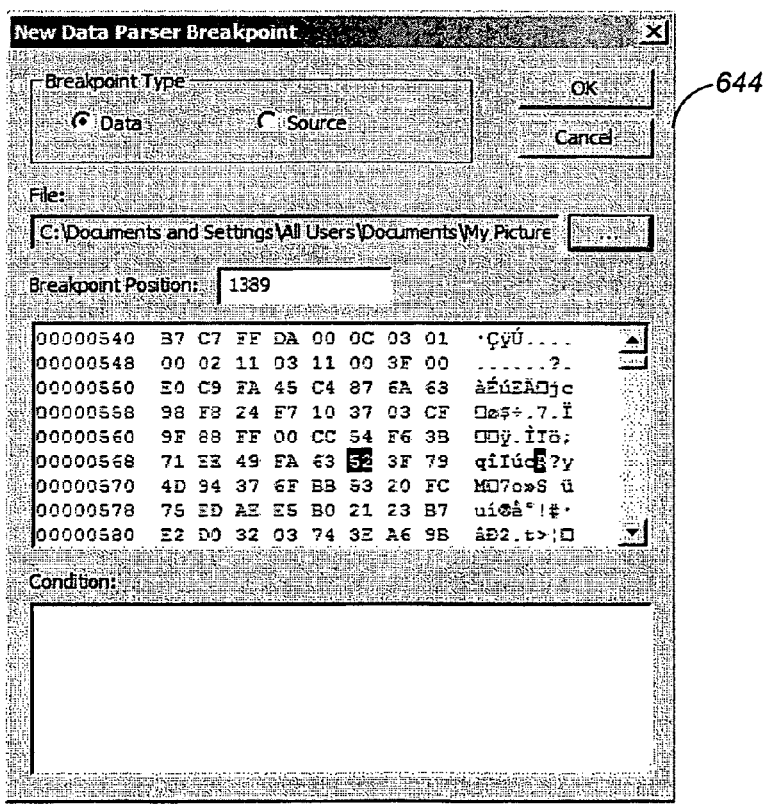
Figure 6F:
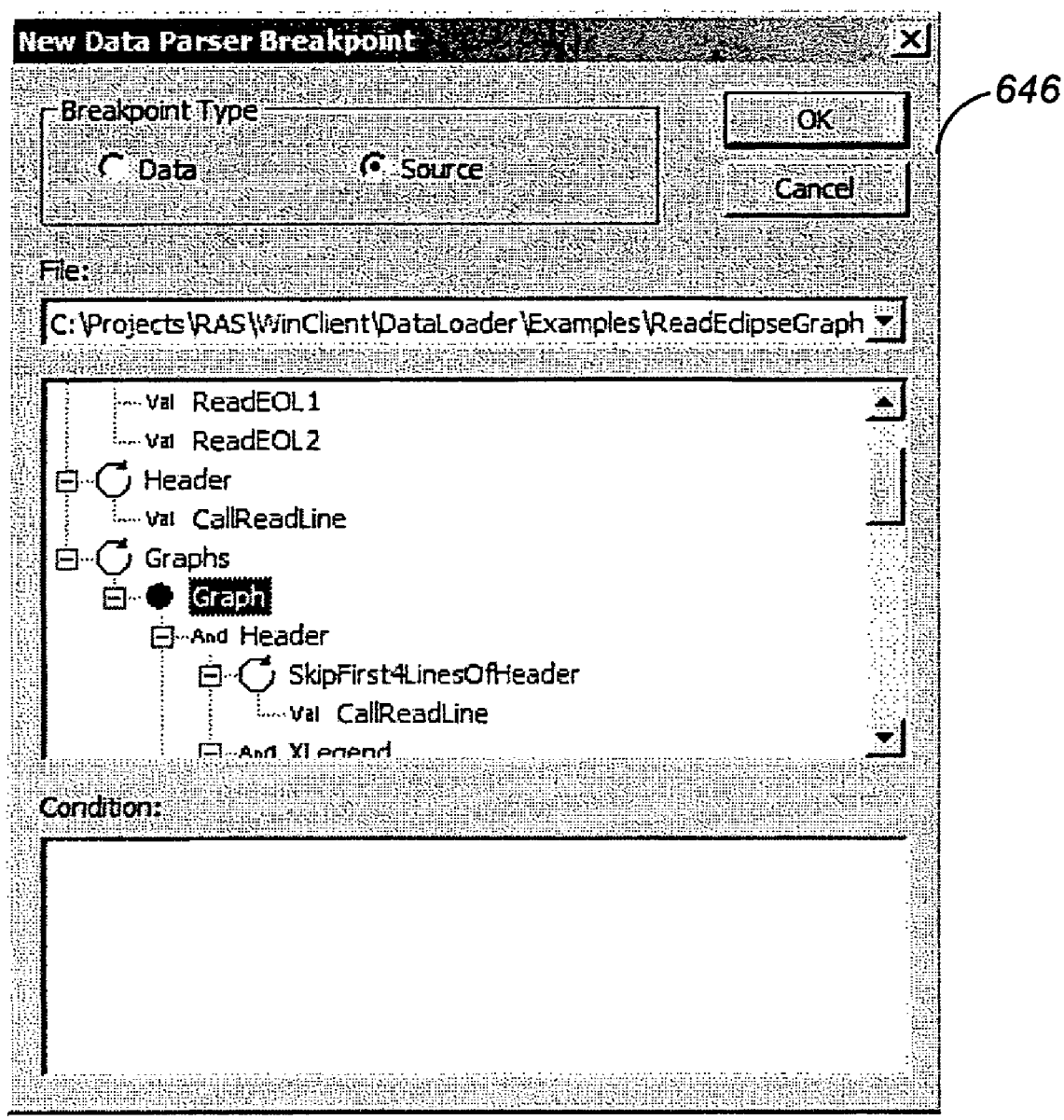

The breakpoints view pane 640 provides a summary of all the breakpoints in every open data parser description, and a convenient way to manipulate them, as illustrated in FIG. 6D. Editor 600 can be used to set data- and source breakpoints, such that the data parser program will break once a certain position is reached in the input data file/stream or data parser description, respectively—for example, using dialogs 644, 646, as illustrated in FIGS. 6E-F.

As noted above, data watches can be used to monitor expression values during debugging operations. The watch view pane 650 shows all data watches currently defined in editor 600. Data watches have two important properties: the context, which specifies a node, and the expression, which specifies an XPath expression that is to be evaluated in the context. The data watch pane 650 is updated with the value of the expression during a debugging run. Data watches can also be used to visualize the value of every node during execution.

Figure 8:
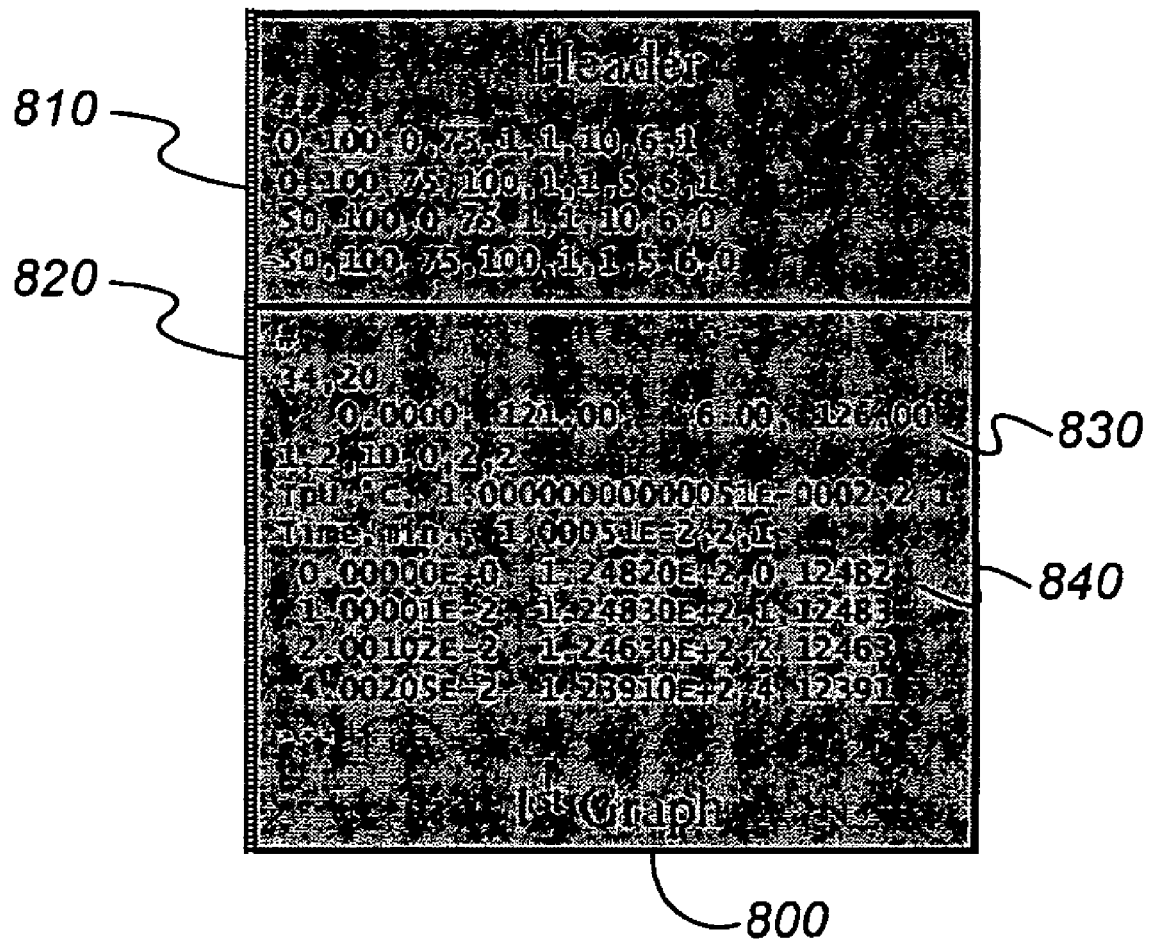
FIG. 8 illustrates a file format capable of being processed according to the data parser description shown in FIG. 7.

An example of using editor 600 to generate a data parser description will now be described. In this example, editor 600 will be used to generate a data parser description 700, illustrated in FIG. 7, that will be used to read an input data file and generate a corresponding XML document. As illustrated in FIG. 8, the input data file 800 contains XY datasets recorded in a text format, or a text version of a graph, and can be broken down into two pieces: a file header 810 and data sections 820. Each data section has a header 830 with XY Legend data and, finally, the XY data points 840.

To create data parser description 700, the user opens a new data parser description file by making the appropriate selection from the File menu in graphical editor 600, and optionally obtains a sample of the input data to use as a template to define the data parser description. The editor automatically creates a top-level, parent AND node 705, which is automatically named FILE_DESCRIPTION. Next, the user defines a ROUTINE node 610, which can be called to complete the reading of a line in the input data file, and which can be useful in exiting an And node successfully. To add the node, the user drags and drops the ROUTINE icon 710 from the toolbox to the position in the data parser description pane 610 immediately below the top-level node 705, and provides a name, ReadLine, which will appear as a (bracketed) element name in the output XML document (unless the Silent property is selected for that node). The user then adds VALUE nodes 715a-c by dragging and dropping from the VALUE icon in the toolbox to the position below the ReadLine node 710. For the first of these, 715a, the user specifies a ReadUntil function and an argument (in hexadecimal) of "\xA \xD", thereby providing that the node will read until the end of the line. For the remaining two VALUE nodes 715b and 715c, the user selects the ReadChar function, specifying arguments of "\xD" and "\xA", respectively, thereby providing that the parsing engine will read the return characters (a Carriage Return "\xD" followed by a Line Feed "\xA") to indicate an end of line on the Windows platform. Since these values are not relevant in the output XML document, the Silent property is selected for each node.

Next, the data parser must read the first section of data: the file header. Since no significant data will be captured in this section, the program simply reads to the end of the line for each line in the header. This is accomplished by calling the ReadLine routine six times—once for each line in the header—with a combination of an ITER node 720, with a Min property of 1 and Max property of 6, and a VALUE node 725, with a Call function with the argument "ReadLine".

To read the actual data sections in the input file, the user creates an ITER node 730, named "Graphs", that will run until all data sections are read and the file is complete. The Max property is set to 2,147,483,647, the largest value allowable for an ITER node in this implementation of system 100, which allows the data parser to perform up to 2.1 billion iterations of this node.

Next, the data parser description must break the data sections down to effectively capture all of the necessary data. Since each data section has multiple parts that will need to be read each pass, the user creates an AND node 735, "Graph", to encompass all of the data section parts. Each data section contains a header portion which can be further broken down into 4 lines of unnecessary information and X and Y legend information, in the format "Title, Units", that will be translated into the output XML document. To capture this data, the user creates below the Graphs\Graph structure an AND node 740 for the "Header" as a whole, which contains pieces for the unnecessary header information (ITER node 745 that reads four header lines and VALUE node 750, which calls ReadLine), as well as two AND structures 755 that capture the required X and Y legend data. These structures include AND nodes 755a ("XLegend") and 755f ("YLegend"), and VALUE nodes to read the actual legend data. For each legend, the Title falls between the beginning of the line and the first comma, so a first pair of VALUE nodes 755b, 755g is added to ReadUntil; ",", capturing the title information for the output XML document (these nodes are not Silent). The next VALUE nodes 755c, 755h reads the comma itself (ReadChar; ","). VALUE nodes 755d, 755i read until the next comma to capture the units (ReadUntil; ","). The final VALUE nodes 755e, 755j exit the current AND structure node with call to the ReadLine ROUTINE.

After capturing the header data for each "Graph", the data parser program must read and capture the actual data. To do so, the user adds an ITER node, "Data", 760 and an AND node, "DataLine", 765, to step through each line of "Graph" data in a manner similar to the X and Y Legends. The "Data" node is an ITER node that can loop many times, such the data parser can collect all of the data lines that define a graph. To enable the data parser to stop reading data lines and start a new graph when it encounters an empty line, the user adds VALUE nodes "Field1" 770a, which reads everything until it reaches a carriage return or a comma, and "Comma1" 770b, which tests to see if Field1 stopped because of a Carriage Return or a Comma (Comma1" succeeds if the character is a comma and fail if it is something else (a Carriage Return)). In the first case, the next node to be evaluated will be VALUE node "Field2" 770c, and so on to parse the data line. In the second case, the error will be propagated to the "Data" node 760, which will succeed since it ran between 1 and 2.1 billion times. A final VALUE node 775 after "Data" node 760 calls the ReadLine ROUTINE to read the empty line that marks the end of a graph. The parse will then go back to the "Graph" node 735 to read the next graph if there is one.

When the data parser description is complete, the user can use the editor to debug and test the data parser description, as discussed above. When the entire data file can be parsed successfully, the data parser description can be used to parse actual input data. To do so, the user selects a parsing technique (Generate XML or CallBack, as discussed above), selects a source of input data for parsing, and specifies a name for the XML output document (if Generate XML was selected). The data parser interpreter then parses the selected input data as specified in the data parser description, and (again, if Generate XML was selected), generates an XML document having a structure corresponding to the hierarchical structure of the data parser description.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for processing electronic data having a first format, comprising:
   defining a data parser description describing the first format, the data parser description including a plurality of leaf nodes and a plurality of branch nodes arranged in a tree structure, the leaf nodes each having an associated function, each of the branch nodes having one or more associated child nodes selected from leaf nodes and other branch nodes;
   receiving input data having the first format;
   processing the input data according to the data parser description, the processing including evaluating the nodes of the data parser description in an order defined by the tree structure, the evaluating including:
      if the node is a branch node, evaluating one or more of the associated child nodes;
      if the node is a branch node, determining whether the node evaluates successfully based on a result of the evaluating one or more of the child nodes;
      if the node is a leaf node, executing the associated function based on data in a current location in the input data;
      if the node is a leaf node, determining whether the node evaluates successfully based on a result of the executing; and
      after evaluating a given node, determining a next node to evaluate based on whether the given node has evaluated successfully; and
   generating output data based on the processing.

2. The method of claim 1, wherein:
   generating output data includes generating structured output data having a structure defined at least in part by nodes of the data parser description.

3. The method of claim 2, wherein:
   the structured output data is generated as an extensible markup language document.

4. The method of claim 3, wherein generating the structured output data includes:
   for one or more leaf nodes of the data parser description, reading data from the current location in the input data, and associating the data read from the current location in the input data with an element of the extensible markup language document.

5. The method of claim 3, wherein generating the structured output data includes:
   for one or more leaf nodes of the data parser description, reading data from the current location in the input data, and executing a callback function to send the data read from the current location in the input data to a client; and
   in the client, associating the sent data with an element of the extensible markup language document.

6. The method of claim 1, wherein:
   the branch nodes include one or more first nodes, each first node being a branch node that evaluates successfully only if all of its associated child nodes evaluate successfully.

7. The method of claim 6, wherein:
   the first nodes include one or more second nodes, each second node being a first node that is evaluated in response to a call function associated with one or more leaf nodes.

8. The method of claim 7, wherein:
   the branch nodes include one or more third nodes, each third node being a branch node that evaluates successfully if any of its associated child nodes evaluates successfully.

9. The method of claim 8, wherein:
   the branch nodes include one or more fourth nodes, each fourth node being a branch node that defines a number of iterations over one or more child nodes.

10. The method of claim 9, wherein:
    the fourth node has a max parameter, a min parameter, and a counter value, and the fourth node is evaluated by:
       evaluating each child node associated with the fourth node;
       if each of the child nodes has evaluated successfully, incrementing the counter value, comparing the counter value with the max parameter, and, if the counter value is less than the max parameter, repeating the evaluating of each child node; and
       if one or more of the child nodes has not evaluated successfully, comparing the counter value with the min parameter;
       wherein, the fourth node has not evaluated successfully if one or more of the child nodes has not evaluated successfully and the counter value is less than the min parameter, and the fourth node has evaluated successfully if the counter value is equal to the max parameter or if one or more of the child nodes has not evaluated successfully and the counter value is greater than or equal to the min parameter.

11. The method of claim 10, wherein:
    the data parser description defines a tree containing a plurality of leaf nodes and a plurality of branch nodes selected from the group consisting of fourth nodes, first nodes, and third nodes, each first node being a branch node that evaluates successfully only if all of its associated child nodes evaluate successfully, each third node being a branch node that evaluates successfully if any of its associated child nodes evaluates successfully.

12. The method of claim 1, wherein:
    processing the input data includes, before evaluating a given node in the data parser description, storing a current position in the input data, and if the given node evaluates unsuccessfully, returning to stored position in the input data source before evaluating a subsequent node in the data parser description.

13. The method of claim 1, wherein:
one or more of the nodes of the data parser description is configurable with a condition, the evaluation of a node configured with a condition being dependent on the performance of a test specified by the condition.

14. The method of claim 1, wherein:
the input data is a data file or a data stream.

15. The method of claim 1, further comprising:
monitoring output from one or more instruments, wherein receiving input data includes detecting a data file or data stream containing experimental data produced by one of the one or more instruments, and using the detected data as the input data.

16. The method of claim 1, wherein:
processing the input data includes using the data parser description to read data from only a portion of the input data.

17. The method of claim 1, wherein:
defining the data parser description includes defining a plurality of data parser descriptions; and
processing the input data includes processing the input data according to the plurality of data parser descriptions, a first portion of the input data being processed according to a first one of the plurality of data parser descriptions and a second portion of the input data being processed according to a second one of the plurality of data parser descriptions.

18. The method of claim 1, wherein defining the data parser description includes:
providing a set of selectable nodes, in a graphical user interface; and
receiving user input selecting and configuring a plurality of the selectable nodes to define the tree structure of the data parser description.

19. A computer program product, tangibly embodied in a computer-readable storage medium, for processing electronic data having a first format, the product including instructions operable to cause data processing apparatus to perform operations comprising:
defining a data parser description describing the first format, the data parser description including a plurality of leaf nodes and a plurality of branch nodes arranged in a tree structure, the leaf nodes each having an associated function, each of the branch nodes having one or more associated child nodes selected from leaf nodes and other branch nodes;
receiving input data having the first format;
processing the input data according to the data parser description, the processing including evaluating the nodes of the data parser description in an order defined by the tree structure, the evaluating including:
if the node is a branch node, evaluating one or more of the associated child nodes;
if the node is a branch node, determining whether the node evaluates successfully based on a result of the evaluating one or more of the child nodes;
if the node is a leaf node, executing the associated function based on data in a current location in the input data;
if the node is a leaf node, determining whether the node evaluates successfully based on a result of the executing; and
after evaluating a given node, determining a next node to evaluate based on whether the given node has evaluated successfully; and
generating output data based on the processing.

20. The computer program product of claim 19, wherein:
generating output data includes generating structured output data having a structure defined at least in part by nodes of the data parser description.

21. The computer program product of claim 20, wherein:
the structured output data is generated as an extensible markup language document.

22. The computer program product of claim 21, wherein generating the structured output data includes:
for one or more leaf nodes of the data parser description, reading data from the current location in the input data, and associating the data read from the current location in the input data with an element of the extensible markup language document.

23. The computer program product of claim 21, wherein generating the structured output data includes:
for one or more leaf nodes of the data parser description, reading data from the current location in the input data, and executing a callback function to send the data read from the current location in the input data to a client; and
in the client, associating the sent data with an element of the extensible markup language document.

24. The computer program product of any claim 19, wherein:
the branch nodes include one or more first nodes, each first node being a branch node that evaluates successfully only if all of its associated child nodes evaluate successfully.

25. The computer program product of claim 24, wherein:
the first nodes include one or more second nodes, each second node being a first node that is evaluated in response to a call function associated with one or more leaf nodes.

26. The computer program product of claim 25, wherein:
the branch nodes include one or more third nodes, each third node being a branch node that evaluates successfully if any of its associated child nodes evaluates successfully.

27. The computer program product of claim 26, wherein:
the branch nodes include one or more fourth nodes, each fourth node being a branch node that defines a number of iterations over one or more child nodes.

28. The computer program product of claim 27, wherein:
the fourth node has a max parameter, a min parameter, and a counter value, and the fourth node is evaluated by:
evaluating each child node associated with the fourth node;
if each of the child nodes has evaluated successfully, incrementing the counter value, comparing the counter value with the max parameter, and, if the counter value is less than the max parameter, repeating the evaluating of each child node; and
if one or more of the child nodes has not evaluated successfully, comparing the counter value with the min parameter;
wherein, the fourth node has not evaluated successfully if one or more of the child nodes has not evaluated successfully and the counter value is less than the min parameter, and the fourth node has evaluated successfully if the counter value is equal to the max parameter or if one or more of the child nodes has not evaluated successfully and the counter value is greater than or equal to the min parameter.

29. The computer program product of claim 28, wherein:
the data parser description defines a tree containing a plurality of leaf nodes and a plurality of branch nodes selected from the group consisting of fourth nodes, first nodes, and third nodes, each first node being a branch node that evaluates successfully only if all of its associated child nodes evaluate successfully, each third node being a branch node that evaluates successfully if any of its associated child nodes evaluates successfully.

30. The computer program product of claim 19, wherein: processing the input data includes, before evaluating a given node in the data parser description, storing a current position in the input data, and if the given node evaluates unsuccessfully, returning to stored position in the input data source before evaluating a subsequent node in the data parser description.

31. The computer program product of claim 19, wherein: one or more of the nodes of the data parser description is configurable with a condition, the evaluation of a node configured with a condition being dependent on the performance of a test specified by the condition.

32. The computer program product of claim 19, wherein: the input data is a data file or a data stream.

33. The computer program product of claim 19, including instructions operable to cause the data processing apparatus to perform operations further comprising:
monitoring output from one or more instruments, wherein 'receiving input data includes detecting a data file or data stream containing experimental data produced by one of the one or more instruments, and using the detected data as the input data.

34. The computer program product of claim 19, wherein: processing the input data includes using the data parser description to read data from only a portion of the input data.

35. The computer program product of claim 19, wherein: defining the data parser description includes defining a plurality of data parser descriptions; and
processing the input data includes processing the input data according to the plurality of data parser descriptions, a first portion of the input data being processed according to a first one of the plurality of data parser descriptions and a second portion of the input data being processed according to a second one of the plurality of data parser descriptions.

36. The computer program product of claim 19, wherein defining the data parser description includes:
providing a set of selectable nodes in a graphical user interface; and
receiving user input selecting and configuring a plurality of the selectable nodes to define the tree structure of the data parser description.

37. A data processing system for managing experimental data, comprising:
a data parser description describing a first data format, the data parser description including a plurality of leaf nodes and a plurality of branch nodes arranged in a tree structure, the leaf nodes each having an associated function, each of the branch nodes having one or more associated child nodes selected from leaf nodes and other branch nodes; and
a parsing engine for processing input data using a computer, the parsing engine having the first format according to the data parser description, the parsing engine being operable to process the input data by evaluating the nodes of the data parser description in an order defined by the tree structure and to generate output data based on the processing, the evaluating including:
if the node is a branch node, evaluating one or more of the associated child nodes;
if the node is a branch node, determining whether the node evaluates successfully based on a result of the evaluating one or more of the child nodes;
if the node is a leaf node, executing the associated function based on data in a current location in the input data;
if the node is a leaf node, determining whether the node evaluates successfully based on a result of the executing; and
after evaluating a given node, determining a next node to evaluate based on whether the given node has evaluated successfully.

38. The system of claim 37, wherein:
the parsing engine is operable to generate structured output data having a structure defined at least in part by nodes of the data parser description.

39. The system of claim 38, wherein: the structured output data is generated as an extensible markup language document.

40. The system of claim 39, wherein:
the parsing engine is operable to generate the structured output data by, for one or more leaf nodes of the data parser description, reading data from the current location in the input data, and associating the data read from the current location in the input data with an element of the extensible markup language document.

41. The system of claim 39, further comprising a client process in communication with the parsing engine, wherein generating the structured output data includes:
for one or more leaf nodes of the data parser description, reading data from the current location in the input data, and executing a callback function to send the data read from the current location in the input data to the client process; and
in the client process, associating the sent data with an element of the extensible markup language document.

42. The system of claim 37, wherein:
the branch nodes include one or more first nodes, each first node being a branch node that evaluates successfully only if all of its associated child nodes evaluate successfully.

43. The system of claim 42, wherein:
the first nodes include one or more second nodes, each second node being a first node that is evaluated in response to a call function associated with one or more leaf nodes.

44. The system of claim 43, wherein:
the branch nodes include one or more third nodes, each third node being a branch node that evaluates successfully if any of its associated child nodes evaluates successfully.

45. The system of claim 44, wherein:
the branch nodes include one or more fourth nodes, each fourth node being a branch node that defines a number of iterations over one or more child nodes.

46. The system of claim 45, wherein:
the fourth node has a max parameter, a min parameter, and a counter value, and the parsing engine is operable to evaluate the fourth node by:
evaluating each child node associated with the fourth node;
if each of the child nodes has evaluated successfully, incrementing the counter value, comparing the counter value with the max parameter, and, if the counter value is less than the max parameter, repeating the evaluating of each child node; and if one or more of the child nodes has not evaluated successfully, comparing the counter value with the min parameter;

wherein, the fourth node has not evaluated successfully if one or more of the child nodes has not evaluated successfully and the counter value is less than the min parameter, and the fourth node has evaluated successfully if the counter value is equal to the max parameter or if one or more of the child nodes has not evaluated successfully and the counter value is greater than or equal to the min parameter.

47. The system of claim 46, wherein:

the data parser description defines a tree containing a plurality of leaf nodes and a plurality of branch nodes selected from the group consisting of fourth nodes, first nodes, and third nodes, each first node being a branch node that evaluates successfully only if all of its associated child nodes evaluate successfully, each third node being a branch node that evaluates successfully if any of its associated child nodes evaluates successfully.

48. The system of claim 37, wherein:

the parsing engine operable to, before evaluating a given node in the data parser description, store a current position in the input data, and if the given node evaluates unsuccessfully, return to stored position in the input data source before evaluating a subsequent node in the data parser description.

49. The system of claim 37, wherein:

one or more of the nodes of the data parser description is configurable with a condition, the evaluation of a node configured with a condition being dependent on the performance of a test specified by the condition.

50. The system of claim 37, wherein: the input data is a data file or a data stream.

51. The system of claim 37, wherein:

the parsing engine is operable to monitor output from one or more instruments to detect a data file or data stream containing experimental data produced by one of the one or more instruments, and use the detected data as the input data.

52. The system of claim 37, wherein:

the parsing engine is operable to use the data parser description to read data from only a portion of the input data.

53. The system of claim 37, wherein:

the system includes a plurality of data parser descriptions; and the parsing engine is operable to process the input data according to the plurality of data parser descriptions, a first portion of the input data being processed according to a first one of the plurality of data parser descriptions and a second portion of the input data being processed according to a second one of the plurality of data parser descriptions.

54. The system of claim 37, further comprising:

means for defining the data parser description, the means for defining the data parser description including means providing a set of selectable nodes in a graphical user interface, and means for receiving user input selecting and configuring a plurality of the selectable nodes to define the tree structure of the data parser description.

* * * * *